United States Patent Office 3,008,887
Patented Nov. 14, 1961

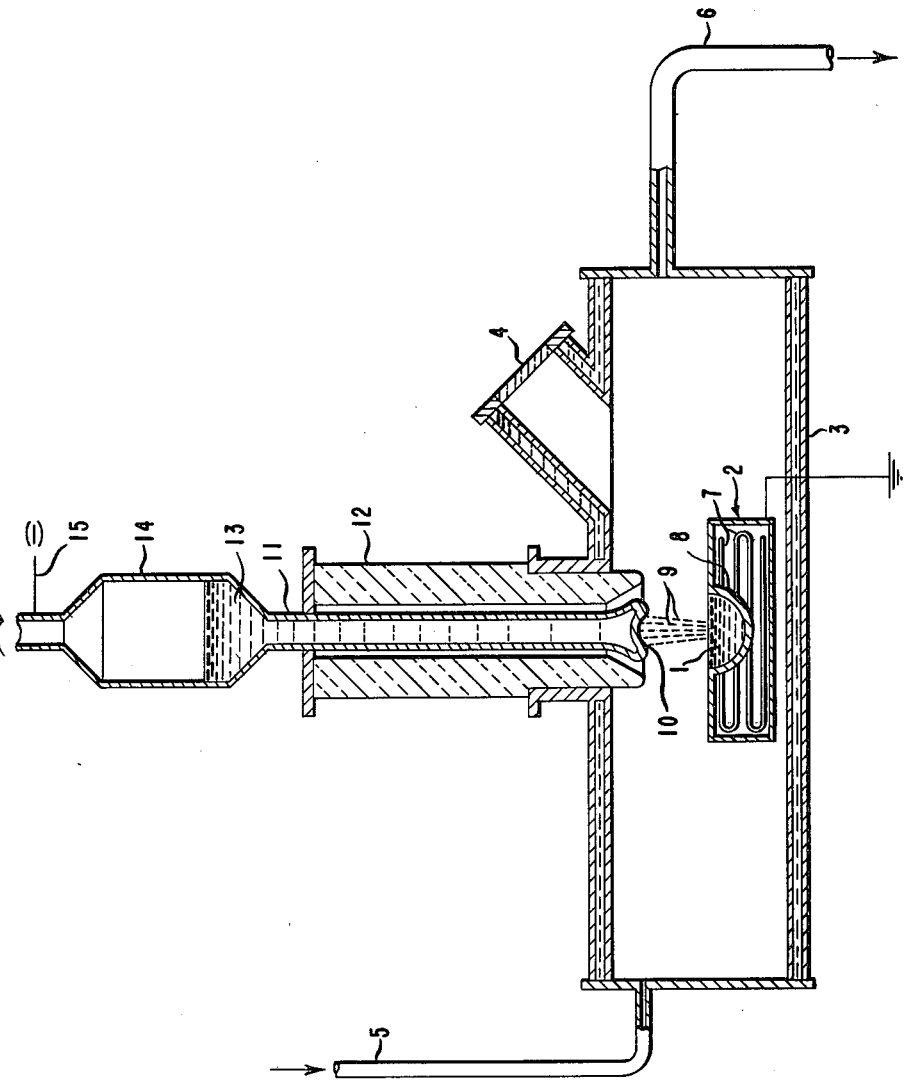

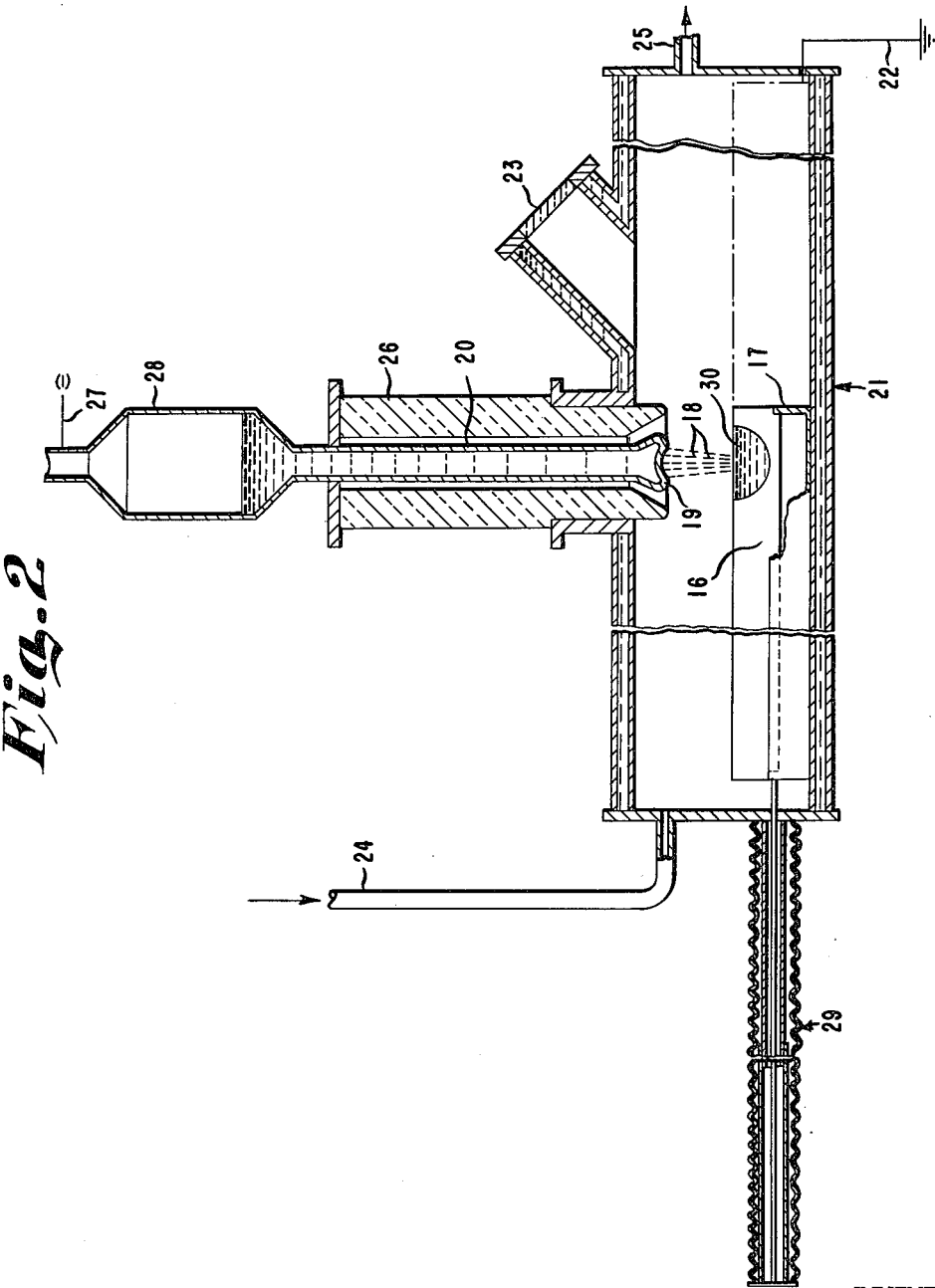

3,008,887
PURIFICATION PROCESS
Heribert Karl Herglotz, Wilmington, Del., assignor to
E. I. du Pont de Nemours and Company, Wilmington,
Del., a corporation of Delaware
Filed Oct. 8, 1958, Ser. No. 765,986
11 Claims. (Cl. 204—164)

This invention relates to the preparation of hyperpure silicon and more particularly to the production of electronic-grade, elementary silicon from a boron-contaminated form of that product.

As is known, trace amounts, measured in parts per billion, of boron, aluminum, arsenic, antimony, phosphorus, and the like, in silicon impairs its usefulness in semiconductor electrical devices, e.g., transistors, diodes, triodes, etc. Prior to use in these applications, it has been customary to subject the silicon to a zone melting treatment designed to segregate the impurities, advantage being taken in the process of the greater solubility of many impurities in liquid than in solid silicon. In this technique, a small, narrow molten section is formed in the silicon body by induction or radiant heating while the body (in the form of a rod or bar) is under an inert atmosphere and retained in a silica or other type of refractory oxide boat or receptacle. The molten section is then progressively refrozen as such section is caused to traverse the length of the bar by relative movement between the bar and source of heat. When impurity segregation is accomplished after several successive passes of treatment, the impurities are cropped from the end of the bar and the purified silicon is recovered. This process has serious disadvantages. The molten silicon corrodes the inner surface of the supporting boat or receptacle, resulting in undesirable contamination by the refractory oxide from which the receptacle is made. Also, unlike most impurities normally dealt with in elemental silicon, the critical impurity boron is not practically removed by this process due to lack of sufficiently favorable solubility relationship between the liquid and solid phases.

In a modification of such zone melting procedure, recourse has also been had to a so-called floating zone technique wherein the silicon body is disposed in vertical relationship within the receptacle out of contact with the calls of the vessel, the liquid silicon zone being supported by surface tension between two solid sections as it traverses the silicon body. While this process minimizes oxide contamination, it also remains unattractive for large scale use because not only is it ineffective for removing boron, but holding the molten zone in place by means of surface tension or partial levitation imposes severe limitations on the diameter and size of silicon body which can be processed therein. In practice, rods of 1″ diameter comprise the maximum size of silicon body which can be processed therein.

In a further modification of the zone melting process, and to overcome the inability of prior procedures to effectively remove boron, treatment of a liquid zone with wet molecular hydrogen has been proposed. While this method will remove boron, it suffers from certain disadvantages that also render it unsuitable for commercial exploitation. For example, only relatively small quantities of silicon can be purified in the process at any one time, and, disadvantageously, the required use of water vapor results in oxidation of both silicon and boron and production of an oxygen contaminated product. Furthermore, up to 20% of the silicon can be oxidized and lost in the process. Disadvantageously also, traces of oxygen contaminant will interfere with the conversion of the silicon product to the single crystal state, a form necessary for device usage. Repeated remelting operations to remove the contaminant from the silicon are then required in which additional silicon losses can occur.

It is among the objects of this invention to overcome the above and other disadvantages characterizing prior methods for purifying silicon, and to provide novel and effective zone melting and refining techniques for attaining these objects. It is among the particular objects of the invention to provide a method for melting and chemically purifying boron contaminated silicon and to obtain a product readily utilizable in semiconductor and electrical device applications; to remove boron from silicon without encountering any objectionable oxygen contamination and the undue silicon losses which are experienced in prior purification methods; to provide a novel, highly economical silicon purification method in which larger amounts of boron as well as other contaminants are effectively removed and within a reasonable number of treatment passes with the recovery of larger quantities of refined silicon at greater production rates and considerably lower costs; to provide a highly useful method for purifying silicon through novel melting or zone refining techniques to effectively remove boron and without subjecting any portion of the molten silicon to contact with or contamination by undesired impurities; and to provide a novel method for obtaining highest purity semiconductor silicon of a quality unobtainable heretofore.

These and other objects are attained in this invention which comprises purifying elemental silicon containing trace impurities by subjecting the silicon to melting within a closed reactor under anhydrous conditions and in the presence of dissociated atomic hydrogen maintained in direct contact with the molten silicon being formed, removing the vaporized reaction product impurities, and recovering the purified silicon product.

In a more specific and preferred embodiment, the invention comprises producing hyperpure, elemental silicon exhibiting desired intrinsic resistivity and other essential characteristics, by subjecting boron-contaminated silicon to zone melting under anhydrous conditions within a closed reactor, throughout the melting operation generating and maintaining an atmosphere of highly active atomic hydrogen in the vicinity of the zone of liquid silicon being formed, removing from the silicon and reactor volatile reaction products formed in the process, and recovering the resulting hyperpure silicon product.

The accompanying diagrammatic drawings, FIGS. I and II, illustrate forms of useful apparatus for adapting the invention to practical application in which concentrated heating and melting of silicon and dissociation, through electrical discharge action, of molecular hydrogen can be effected to obtain the beneficial advantages afforded by the invention. Referring particularly to FIG. I, silicon containing undesired, trace amounts of boron or other contaminants, such as phosphorus, arsenic, antimony, oxygen, etc., can be charged, in particulate or solid form, to a hemispherical or other form of suitable receiving chamber 1 of a molybdenum or other desired form of high temperature-resistant metal hearth 2 disposed within an electrically grounded steel or other type metal reactor 3. The reactor can be water or otherwise externally conventionally cooled and provided with a sight glass 4 for readily observing the melting and purification operations. An inlet 5 is provided in said reactor through which dry molecular hydrogen from a source of supply (not shown) can be continuously introduced into the reactor as a stream and at controlled rates through the area or vicinity in which liquefaction is taking place of the silicon being treated. A reactor outlet 6 is provided through which evacuation of the system and removal of volatile reaction products can be effected. The hearth 2 is provided with a plurality of cooling coils 7 for the passage of water or other desired liquid or fluid coolant to maintain the hearth at any desired, relatively cool temperature and to form and maintain within the chamber 1 during the heating operation a frozen silicon skull or liner 8. The hearth 2 is, as shown, electrically connected as the anode for a self-maintaining gas discharge heating current 9 emitted preferably from a silicon emission surface 10 of a cold cathode element 11 suitably associated with the reactor. Preferably, also, the emission surface 10 is substantially circular in form and concaved to focus its heating current on the silicon anode hearth 2 disposed and maintained during the purification operation in close proximity to and within a few inches below said surface. Advantageously, such form of emission surface forms in the silicon being treated a molten zone of slightly smaller diameter than the emission surface. To prevent emission to any surface other than the mass of silicon being treated as well as to shield such emission surface, a silica or other suitable type of shielding element or insulator 12 is suitably associated with the cathode. The emission surface 10 can be cooled by means of water or other coolant 13 which boils into and is refluxed from an associated condenser 14 which is maintained in open relationship with the atmosphere and is connected to a negative terminal 15 to complete the electrical circuit.

In operating an apparatus of the type just described in accordance with one embodiment of the invention, a mass of impure silicon to be purified is charged to trough 1 of hearth 2 and such charge is brought into relatively close proximity with the emission surface 10 of cathode 11. The reactor is thereupon closed from the atmosphere and almost completely evacuated through conduit 6 whereby a reduced pressure ranging from about .01 to 20 microns (Hg) will prevail. Dry molecular hydrogen gas is then passed into the reactor at a controlled rate through the inlet 5 to maintain a hydrogen pressure of .1 to 1000 microns (Hg). Cold water is continuously circulated through the coils 7. The current is turned on while the hydrogen flow and relatively constant pressure conditions mentioned prevail to create the gas discharge heating current and effect melting of the anode silicon at a temperature above its melting point but below its vaporization temperature at the prevailing ambient conditions. In this manner, dissociation of the molecular hydrogen takes place with generation of atomic hydrogen adjacent to and in contact with the surface of the molten silicon being forced. The silicon anode mass, except that portion thereof adjacent the surface of the cold hearth and which forms the skull 8 becomes melted in the process to cause reaction of the boron and other impurities present in the silicon with the atomic hydrogen generated and the removal of such impurities as reaction products from the silicon and reactor by the action of vacuum pumping system being utilized. The electrical power employed is of high voltage and low amperage and because of the relatively large area of the cathode emission surface, the current density is relatively low at the cathode. The charge of silicon is held in the molten state until the desired product purity is attained. To consolidate particulate silicon and simultaneously remove boron and other impurities, recourse to successive melting operations can be had and until the hearth opening of trough 1 becomes filled with the melted and chemically purified silicon product.

In the adaptation shown in FIG. II, purification is effected of a relatively long bar or rod of silicon containing objectionable boron and other contaminants. In this modification, the bar is passed through a narrow heating zone operating at temperatures high enough to melt a confined zone of the silicon and while atomic hydrogen is concurrently generated within the heating zone by means of an electrical discharge, said confined molten silicon zone being caused to progressively traverse the length of said bar. Thus, in this apparatus, impure, boron-contaminated silicon in the form of an elongated, semi-cylindrical bar 16 is suitably positioned within a snug-fitting water cooled copper or other desired metal hearth or trough element 17 which is electrically connected as the anode for a self-maintaining gas discharge heating current 18 emitted from the silicon surface 19 of an associated cold copper cathode 20. The hearth can be positioned as shown within a water-cooled horizontally disposed tubular metal reactor 21 which, as shown, can be electrically grounded at 22, and provided with a sight glass 23, an inlet conduit 24, and an outlet conduit 25. The cathode 20 is electrically insulated from the reactor 21 by means of a silica or other suitable insulating sleeve 26, which restricts discharge to the focusing surface of said cathode, and is suitably connected to the negative terminal 27 which completes the circuit. The emission surface 19 can be cooled through means of a coolant adapted to be refluxed in the condenser element 28. Arranged in operative relationship with one end of the reactor 21 is an enclosed manually or electrically operated bellows and rod moving mechanism 29 through the medium of which longitudinal movement of the bar 16 at any desired traversing speed or rate past the cathode emission surface 19 can be effected.

In carrying out the invention in such FIG. II apparatus, the bar of silicon containing trace amounts of boron and other impurities, measuring, say, 2 inches in width, ¾ inch thick and 12 inches long, can be placed in the water cooled copper trough 17 and in electrical contact relationship therewith. The hearth and bar are then positioned within the electrically grounded, horizontal tubular water-cooled steel reactor which, for example, can have an 8-inch internal diameter and be 26 inches in length. In association with the reactor a 1½ inch diameter copper cathode 20 can be provided, having an emission surface 19 of silicon and electrically insulated from the steel reactor and its enclosed space by means of a silica insulating sleeve 26 which also functions to restrict current discharge to the focusing surface of the cathode. The silicon bar is so positioned within the reactor that one end thereof is disposed immediately beneath the cathode emission surface and can extend about 1 inch beyond such surface. The reactor is then closed and the vacuum pump (not shown) connecting with the outlet 25 is turned on and the reactor pressure is reduced to about 10 microns (Hg). Dry molecular hydrogen gas is then introduced into the reactor via the conduit 24 and at a controlled rate of about 5 milliliters per minute, the pumping being continued and the pressure being maintained in the range of about 150–250 microns (Hg). An electric current is then caused to flow through the circuit, causing the directionally focused gas discharge between the cold surface cathode and the anode, the current being increased slowly to initially heat and then melt a portion of the silicon. When the discharge from the cathode results in sufficient heating to cause formation of a molten silicon pool 30 within the silicon bar 16, such bar is caused to be advanced through the reactor by actuation of the mechanism 29 at a rate of about 6 inches per hour and until the end of the silicon mass is reached. The advance of the pool 30 in the bar 16 is interrupted just short of the point where the pool retaining edge of the silicon mass would become melted. By this procedure, the molten pool throughout the entire purification is retained within a solid skull of silicon formed by the removal of heat from the environs of the bar through the cooling action of water or other media through the tubes provided for this purpose in the trough 17. The hydrogen flow is regulated to insure the presence of an effective concentration of atomic hydrogen at all times on the surface of the silicon pool for reaction with boron, phosphorus or other impurities in the melted silicon. Continuous maintenance of the reduced pressure contemplated insures a pumping rate which will remove excess hydrogen and any reaction product gases such as phosphine and boron hydride from the silicon and reactor. This rate and hydrogen flow can be varied as required and depends on the impurities initially present in the silicon and the pressure required to maintain satisfactory operation of the self-maintaining gas discharge. When the molten zone traverses the length of the silicon mass, the electric current flow is interrupted and the mass is cooled to form a completely solid bar which is then removed from the reactor. Such portions of the bar not traversed by the molten zone are cut away, cropped, or otherwise removed from the purified portion, and the last portion to solidify, containing the segregated impurities, is also removed. The recovered silicon product, when tested for resistivity, will be found to exhibit greatly increased values over the original silicon mass due to effective removal of critical impurities, especially boron.

To a clear understanding of the invention, the ensuing specific examples are given. These are merely illustrative and are not to be considered as limiting its underlying principles and scope.

EXAMPLE I

Employing a gas discharge melting apparatus of the type shown in FIG. I, a boron-contaminated silicon mass recovered from the thermal decomposition of silane was subjected to melting and purification in such apparatus. The mass of silicon was held in molten state under anhydrous conditions while volatile reaction products formed by reaction of impurities with the atomic hydrogen radicals produced in the gas discharge heating current were removed via the outlet to the vacuum system. The cold cathode had an emission surface of silicon and was cooled by water, allowed to boil and reflux in the condenser which was open to the atmosphere and connected as the negative terminal. The emission surface was circular, being 1½ inches in diameter, and concave. The cold cathode was shielded by a silica insulator to prevent emission to any surface other than the silicon mass on which the emission surface was focused. The cathode surface was positioned 2 inches above the surface of silicon being refined which formed the anode for the gas discharge and was in electrical contact with the water-cooled hearth. Both hearth and cathode were enclosed in the electrically grounded steel tube reactor. A 2-inch diameter hemispherical opening in the hearth was filled with the silicon mass which was compacted to fit the opening. The enclosure was evacuated and dry hydrogen was passed into the apparatus at about 5 milliliters per minute to maintain a pressure of 170 microns (Hg). The current was turned on while maintaining the hydrogen flow and reduced pressure, using 7 kilovolts and 120–170 milliamps., to form the gas discharge heating current. Melting at a temperature of 1420° C. took place in the presence of atomic hydrogen of the silicon anode material except that portion immediately adjacent to the surface of the cooled hearth. The boron removal results achieved are shown in Table I below. They were obtained from one inch square, ⅜ inch thick test pieces cut from the solidified melt after its removal from the apparatus:

*Table I*

| Time of Retention of Silicon in Molten State | Boron p.p.b.[1] | |
|---|---|---|
| | Sample (a) | Sample (b) |
| 0 minutes | 3.0 | 1.2 |
| 5 minutes | 1.5 | |
| 40 | | 0.4 |

[1] Atom parts per billion.

EXAMPLE II

Employing the apparatus and duplicating the conditions of Example I, a boron-contaminated silicon mass, prepared by the vapor phase reduction of silicon tetrachloride with zinc, was purified. The mass was shaped by casting to fit the hemispherical opening of the anode hearth. A molten zone 1¼" in diameter and ½" deep was established in the mass by means of the gas discharge heating current. Upon holding the silicon in a molten state in the presence of atomic hydrogen for the time periods indicated in Table II below, resistivity values given were obtained by testing the upper surface of the solidified melt after it had been ground smooth in bar form for testing purposes:

*Table II*

Resistivity, ohm-cm.
Bar with initial P-type resistivity _____ 2
After 30 minutes in molten state _____ 7
After additional 30 minutes in molten state _____ 23

EXAMPLE III

An apparatus of the type shown in FIG. I was employed in this example for melting, consolidating and purifying silicon by gas discharge means in the presence of atomic hydrogen. A cold cathode concave emission surface of silicon 8 inches in diameter was employed and the water-cooled hearth was provided with a cylindrical opening 6 inches in diameter and 2 inches deep, the top of which was positioned 5–6 inches below the cathode. The silicon purified was prepared by the hydrogen reduction of trichlorsilane on a hot quartz surface. The silicon mass was broken up into small pieces and placed in the opening of the hearth. After evacuation of the system to a pressure of 1 micron (Hg) and starting introduction of dry hydrogen at 10 milliliters per minute, a hydrogen pressure of 200 microns (Hg) was maintained, the gas discharge heating current was established, using 10 kilovolts and 1000 milliamps. to melt the rod pieces down in the hearth. The molten zone formed was maintained for one hour, and the cropped silicon product recovered proved to be of excellent semiconductor quality, containing less boron by a factor of 8–9, than the starting material.

EXAMPLE IV

A vacuum arc type consumable electrode apparatus was employed for melting and purifying elemental silicon which had been previously cast into a 1½" rod 8 inches in length by pouring molten silicon containing a very slight amount of boron, into a silica tube having a 1½" internal diameter. The cast rod was placed in the water cooled electrode holder. One inch of the rod was surrounded by the water cooled steel holder, the remainder extending vertically downwardly from the holder as a consumable cathode. A vertically movable copper, water cooled crucible was positioned directly below the cathode, and electrically connected as the anode and was used to collect the silicon melted and dripped into it. The crucible had inside dimensions of 4 inches diameter by 4 inches height. A piece of pure silicon 2 inches in diameter and ⅛ inch in height was placed in the bottom of the crucible and served as a starting stud. The silicon anode and the crucible were disposed within a water cooled electrically grounded steel shell provided with a gas inlet and outlet. After evacuation, dry hydrogen was introduced at the inlet at the top of the anode, the gas outlet being connected to a conduit leading to a cold trap and vacuum pumping system. A pressure of about 100 microns (Hg) was maintained in the system by continuous pumping and by continuously introducing small amounts of molecular hydrogen. A vacuum arc started between the silicon cathode and the silicon in contact with the anode crucible by raising the crucible to within ¼" of the tip of the silicon cathode. The crucible was then lowered and the silicon cathode slowly melted by the arc discharge plasma containing atomic hydrogen. The melting silicon caused formation of a film which flowed down the cathode rod surface from the bottom two inches of the rod and dripped off into the crucible. Sufficient water flow in the crucible walls was provided to maintain the upper ¼–½ inch portion of silicon in the molten condition as the crucible is filled. After 2 hours' operation, all of the silicon cathode, except the last 3 inches, was consumed and dripped into the crucible. Vaporous by-products and reaction products were removed from the shell into an associated vacuum trapping system. Upon removal after cooling, the silicon product was tested and found to be exceptionally low (.4 p.p.b.) in boron and therefore, suitable for use as hyperpure semiconductor grade material.

EXAMPLE V

A silica melting vessel for silicon 4 inches in diameter and 10 inches high was snugly positioned within a graphite vessel. The latter was surrounded by a silica pot slightly larger in diameter and about twice as tall, with a snug fitting cover. Disposed about the larger silica pot a high frequency induction coil of ten turns and 10 inches in height was provided. The cover of the larger silica pot was equipped with a hydrogen gas inlet and with a tungsten electrode, movable to maintain an arc, the hydrogen inlet being so arranged as to pass that gas through the arc and onto the surface of the silicon being purified whereby atomic or activated hydrogen will be generated in the presence of molten silicon. A vapor outlet was provided in the silica melting vessel for removing by-product gases from the system. A charge of silicon, containing impurities including boron, is heated both by the atomic hydrogen torch and by the induction coil to melting point, held at the melting point for one hour, and then allowed to cool, while maintaining a flow of dry hydrogen over the charge until cold. The silicon product is substantially free of boron and other impurities and after zone refining to remove tungsten atoms is of excellent semiconductor quality.

EXAMPLE VI

A mass of silicon needles prepared by the vapor phase reduction of silicon tetrachloride with zinc of high purity but containing trace amounts of boron, phosphorous, antimony, arsenic and oxygen impurities was placed in a water cooled molybdenum container having a 6 inch internal diameter and 4 inch height. This container was positioned within a 12-inch high electrically grounded, water cooled enclosing steel shell slightly larger in diameter than the container. The container was electrically connected as the anode for an electric gas discharge heating current and was adapted to be adjustable in height from means outside the enclosure. In association with the container, a circular cathode having a thin 4 inch diameter concave silicon coated emission surface was provided and was maintained at a relatively low temperature by means of water cooling, open to the atmosphere. The cathode was insulated from the shell by means of a silica insulator having a diameter at the base about equal to that of the container.

Dry molecular hydrogen gas was bled into an annular space provided between the cathode and cathode insulator through an inlet while vacuum pumping the system through an outlet conduit to maintain a pressure of about 100 microns within the enclosure. After effectively purging all gases except hydrogen from the gas space, a 400 milliamps. at 9 kilovolts current was turned on to obtain a gas discharge heating current between the cathode emission surface and the anode silicon charge in the container. Melting at a 1420° C. temperature was obtained substantially immediately to form a molten pool of silicon in the presence of dissociated hydrogen. Close to the inner surface of the water cooled container a thin area or skull of unmelted silicon remained between the melt and said inner surface. The hydrogen gas activated in the gas discharge reacted with the impurities present in the molten silicon and these were removed therefrom in the vacuum system. After the entire system was allowed to cool, the solidified pure silicon product was recovered. That portion of the silicon which had not been melted is removed by cropping, leaving a solid mass of extremely high purity (particularly low in boron, phosphorous, antimony, arsenic, and oxygen), and suitable for use in the most exacting semiconductor applications.

EXAMPLE VII

A zone melting apparatus comprising an 18-inch diameter steel shell of the type shown in FIG. II was employed in this example. The cathode emission surface was 5½ inches in diameter and concave in the short dimension to make an elliptical molten zone about 3 inches x 7 inches across an associated water-cooled copper anode trough 7 inches in width, 4 inches in depth and 24 inches long. The trough was completely filled with high purity silicon needles obtained from the vapor phase reduction of silicon tetrachloride with zinc. The apparatus was evacuated and dry hydrogen gas was passed into it at 50 milliliters per minute while maintaining a pressure of 50 microns (Hg). The current was turned on and increased stepwise to avoid arcing before melting. At about 10 kilovolts and 1000 milliamps., the cathode gas discharge became steady and melting took place in the presence of the atomic hydrogen formed in the cathode discharge of all needles, save a thin film adjacent the surface of the copper trough. No damage to the water-cooled copper anode trough occurred since due to the cooling effected the silicon quickly froze at its furnace. The anode was advanced through the apparatus at the rate of one foot per hour while maintaining constant reduced pressure and current conditions and vaporized reacted impurities were removed as formed. During passage of the anode under the cathode successively melting and freezing of the silicon needles took place and a mass of silicon was formed, solidified on the walls of the anode but not completely filling the trough. The vacuum pumping, hydrogen inflow, and electricity were shut off, and more silicon needles are added to the partially filled trough. This melting, chemical purification, and zone refining procedure was repeated, as above, and then the silicon bar was turned over and the treatment repeated to cause the molten zone formed therein to pass through the bar in the same direction. On completion of the treatment, the finished bar was removed from the apparatus and the portions of silicon adjacent to the copper anode and the final molten zone were removed. On test of samples of the hyperpure silicon product obtained, it was determined that its resistivity was at a value of 850 ohm centimeters p-type with a base boron level of 0.35 part per billion, while that of the needles melted and zone refined without the presence and use of atomic hydrogen possessed a 100 ohm centimeters value.

EXAMPLE VIII

Employing the zone melting apparatus shown in FIG. II and utilizing the operating conditions described in Example VII, a silicon bar 1½ inches in diameter and cut in half to make a semicircular-shaped bar, 12 inches long, was subjected to purification. The 1½ inch diameter silicon concave emission surface of the cathode was water cooled. The bar was placed in the water-cooled copper anode trough within a tubular steel reactor having a 6-inch internal diameter and the apparatus closed and evacuated. A small stream of hydrogen is then charged to the apparatus and the current turned on to obtain a self-maintaining gas discharge. Initially, to avoid arcing, the current is increased stepwise. At about 6000 volts and 140 milliamps. and a flow of hydrogen of 5 milliliters per minute while a pressure of 170 microns (Hg) is maintained, the discharge becomes stable, and a zone of molten silicon immediately under the cathode forms. This molten zone is slightly over 1¼" in diameter and about ⅜ inch in depth. The bar is then advanced through the reaction vessel under the cathode at a rate of 1 inch in 10 minutes, and as it advances the molten portion solidifies following its removal from beneath the cathode and the advance or new portion of the bar which comes under the cathode gas discharge becomes melted. This process continues until the molten zone traverses the bar length. At the completion of the run, the bar is removed from the apparatus, and the portions thereof not subjected to melting are cropped therefrom by means of diamond wheel cutting, along with the last refrozen molten zone. On testing samples of the purified, recovered bar it was found that its resistivity had changed from p-type 10 ohm-centimeters to p-type 240 ohm-centimeters by the foregoing zone refining operation. Employing the same conditions, but repeating the traversing operation five times, resistivity of the bar was found to have increased approximately 50 fold.

EXAMPLE IX

Utilizing a zone melting apparatus of the type shown in FIG. II and operating under the conditions described in Example VII, high purity needles of silicon made by the vapor phase reduction of silicon tetrachloride with zinc in accordance with U.S. 2,773,745 were treated. The water cooled cathode emission surface was composed of silicon, was circular in shape, being 1½ inches in diameter, and had a concave curvature equivalent to the surface of a cylinder 2 inches in diameter and with its axis perpendicular to the line of travel of the anode hearth. Said cathode surface was positioned 2 inches above the surface of the silicon anode material under refinement and purification. The tubular enclosure for the reduced pressure chamber consisted of a 4-inch steel pipe. A water-cooled molybdenum anode trough containing a 1½ inches wide x 6 inches long x ¾ inch deep opening in the top was employed for forming the silicon bar, such opening being first filled with the high purity silicon needles. The apparatus was evacuated and the pressure was raised to 170 microns (Hg) by passing in dry hydrogen gas at 5 milliliters per minute and maintained constant at that value. The current was turned on, using 7 kilovolts and 120–170 milliamps., and a molten zone was formed in the bar and caused to advance through the apparatus by reason of movement of the bar under the cathode emission surface at a rate of one inch per five minutes. Melting of the needles with boron removal through reaction with the atomic hydrogen present took place to induce the desired zone refining and purification. The results obtained are shown in the following Table III in terms of boron and phosphorous impurity content, both before and after a single pass, as well as after multiple passes. Separate silicon samples were used in each instance from a ¼ inch square x 4 inches long bar cut from the upper part of the recovered final ingot.

*Table III*

|  | Starting Needles, p.p.b.[1] | Single Pass, p.p.b.[1] | 4 Passes, p.p.b.[1] | 10 Passes,[2] p.p.b.[1] |
|---|---|---|---|---|
| (Boron) | 2.8 | 1.6 |  |  |
| (Boron) | 1.1 |  | .7 | .5 |
| (Phosphorus) | 3.8 |  | 1 | .5 |
| (Boron) | 1.0 |  |  | .4 |
| (Phosphorus) less than | 1.0 |  |  | 0 |
| (Boron) | 4.4 |  | .8 |  |
| (Phosphorus) | 2.4 |  | Less than 1.0 |  |

[1] Atom parts per billion.
[2] Advanced at a rate of one inch in three minutes.

While described as applied to certain specific embodiments, the invention obviously is not limited thereto and variance therefrom is contemplated without departing from its underlying principles and scope. The invention will be found to be generally applicable to the purification of all grades of silicon, whatever its source and for reducing effectively the impurity content thereof by subjecting it while in the molten state to direct contact with atomic hydrogen in accordance with the invention. Thus, metallurgical grade silicon can be markedly improved in respect to its impurity level by recourse to the present process. In preparing silicon for use in most semiconductor applications, it will be found preferable to start with a silicon material of higher initial purity and such as that obtained by the vapor phase decomposition of a silicon halide, particularly silicon tetrachloride by zinc, from the hydrogen reduction of trichlorsilane, the thermal decomposition of silane, etc. Not only is boron effectively removed from the silicon but ready removal is accomplished of other undesired impurities or mixtures of such impurities or their compounds, including elements such as phosphorus, antimony, arsenic, oxygen, etc. Boron removal by reaction with atomic hydrogen to form volatile reaction products is highly advantageous because removal of that element by recourse to the usual zone refining methods has proved almost completely impractical on an economic basis. Because of the very slight segregation of boron obtained in such prior zone refining operations, a very large number of passes has been required before even fair results can be achieved by such prior processes. Advantageously, atomic hydrogen use in accordance with the invention to purify silicon while in molten form enables utilization of the process while the zone melting operating is being carried out and results in exceptionally high purity being achieved at considerably lower cost. Furthermore, although silicon is present in tremendous excess compared to the trace impurities being removed unexpectedly, such silicon reacts less readily with the atomic hydrogen and as a result very little or no loss of silicon will be experienced in the process. In consequence, one can obtain herein polycrystalline or single crystal silicon exhibiting desired minimum resistivity and lifetime values. For example, such silicon will have a base boron content below 1 atom of boron per 3 billion silicon atoms, and a minimum resistivity of 800 ohm cm. p-type with a minimum lifetime of 500 microseconds after conversion to single crystal form.

The invention can be generally applied to all types of zone melting processes wherein a concentrated heating and melting of a silicon mass is effected without causing the melt to run from such mass. If desired, the refining operation can be carried out by passing the silicon mass through a series of narrow heating zones operating at temperatures high enough to melt the silicon in the presence of dissociated hydrogen, with intermediate cooling zones being provided to attain the continuous silicon melting and freezing desired in these zones. Following purification, the solute rich end of the treated silicon mass can be removed and the remainder of said mass remelted and refrozen until the desired ultrapure product exhibiting the intrinsic resistivity characteristics sought is obtained. In a further modification, the silicon to be melted can be placed in the water-cooled anode hearth as a mass of silicon in particulate form, such as needles, loosely aggregated crystals, fines, chunks or compacted particles and melted to consolidated form during the zone refining operation. If desired, as an initial pass to effect melting of the particulate material, more silicon may be added and the operation repeated to provide a boron and other impurity-free zone refined bar completely filling the anode hearth opening. In an additional modification, upon completion of one pass of the silicon mass to effect a partial zone melting and purification of one side of the bar or mass being refined, said bar or mass can be turned over and its opposite side zone refined so that a different but overlapping segment of the bar will be traversed by the molten zone. In this manner, if two sides of a relatively flat, narrow bar should be given an initial pass and the bar reversed and given a second pass in the same direction, recovery of the zone refined section will merely require removal of the two edges which were not subjected to melting and the final molten zone containing the segregated purities. If a square form of bar of mold is treated, it may be turned successively so that each side is successively zone refined. By this procedure, much less unmelted and unrefined material need be removed to recover the product after making four passes of the silicon body through the apparatus.

The generation of atomic hydrogen in the reactor can be effected in any desired manner. Preferably, it is accomplished by recourse to the described self-maintaining cathodic gas discharge. In effecting the dissociation, molecular hydrogen is flowed through the reactor preferably in the form of a continuous stream for passage over and in contact with the silicon surface or a portion of such surface being maintained in molten state in and in conjunction with means adapted to form dissociated hydrogen in the presence of the molten silicon whereby atomic hydrogen is at all times concentrated during the treatment on the surface of the molten silicon.

As already indicated, the heating, melting and generation of atomic hydrogen is preferably effected by the self-maintaining gas discharge heating current from a cathode surface which is maintained in the solid state by direct cooling and at a relatively low temperature which can range from about 100–500° C. A convenient and effective method for attaining such cooling is through the provision of the reflux condenser shown in the drawings disposed above the hollow cathode so that water or other fluid present therein is evaporated, condensed, and returned directly to such surface. Through use of a completely dielectric coolant and insulating tubing a suitable circulation system can be used if desired. The cathode surface is made of electrically conducting material. However, due to the high voltage and low amperage characteristics, very low conductivity materials, such as silicon, can be used as can relatively high conductivity metals. In addition, metals such as zinc, aluminum, magnesium, tantalum or chromium can be used. While aluminum will prove suitable, use of a silicon cathode surface is preferred due to the fact that if any atoms are discharged from such surface no contamination will result of the silicon being refined. Insulation of the cathode above the focusing surface can be conveniently effected by use of such refractory insulators as zircon, steatite, alumina or silica.

The conditions of operation of the self-maintaining gas discharge will vary with the amount and type of silicon being refined. In general, a substantially constant hydrogen gas pressure within the range of 0.1 and 1000 microns (Hg) and preferably within the range of 1–300 microns (Hg) is maintained throughout the melting operation by continued out-pumping and introduction of gas as needed. A voltage and current sufficiently high to maintain the desired liquid zone will be found to depend upon the relative dimensions of the silicon mass being melted, the size and shape of the cathode surface, and the distance between electrodes. For practical operation, a potential within the range of 5 and 50 kilovolts (average) and a current within the range of 50 and 2000 milliamps are utilized. However, these portions depend on size and there is no theoretical limit for the amount of silicon being melted and purified. When atomic hydrogen purification is combined with zone refining, the rate of silicon travel utilized will depend on the geometric shape of the silicon, the degree of heat penetration and the efficiency of zone purification and chemical purification desired. Multiple, laterally spaced emission cathodes can be used if desired to obtain multiple, separated molten zones within a single bar or mass, to thereby reduce the elapsed time required to effect a desired number of passes by simultaneously traversing a bar with several molten zones in the same direction along the same or multiple pass.

Use is also contemplated in the invention of any conventional electrical discharge system in which the silicon mass under treatment in a dry, water-free evacuated enclosure can comprise the anode for a cathode from which a concentrated gas discharge is emitted for heating and melting a confined, narrow zone in said mass with concurrent generation of dissociated hydrogen from molecular hydrogen being passed into the gas discharge. Other systems including the Langmuir atomic hydrogen torch (such as described in "Phenomena of Atoms and Molecules," published by Philosophical Library, Inc., 1950, pp. 124–145) already mentioned can be used as can other forms of electron bombardment heating, including the so-called electron gun which is similar in principle to that employed in cathode ray tubes. Also useful are the so-called glow discharge systems such as described by R. W. Wood in Phil. Mag., vol. 44, pp. 538–546 (1922), and the electron torch described in the Journal of Physics and Chemistry, vol. 22, p. 1360 (1954).

Heating the elemental silicon to the desired melting temperature and holding it in the molten state is preferably effected through the same means employed to generate the atomic hydrogen at the molten silicon surface including recombination of atomic hydrogen. However, recourse can be had and use is contemplated of other heating means such as high-frequency induction or radiation.

The activated or atomic hydrogen used herein preferably comprises atomic hydrogen and other hydrogen radicals generated in the reactor in the presence of the molten silicon and which in contrast to molecular hydrogen is highly reactive. For example, it is known that dry molecular hydrogen can be passed over molten silicon containing boron under atmospheric pressure or vacuum conditions without its having any effect upon the boron and without change taking place in the electrical properties of the silicon. Passing activated hydrogen over such silicon, on the other hand, advantageously eliminates or decreases such boron content. While formation of such pure, activated atomic hydrogen within the reactor is preferred since recombination to form molecular hydrogen will take place under some circumstances, the atomic hydrogen can be formed externally of the reactor through recourse to electrical discharge dissociation or other desired conventional means, and can be fed as desired as an atomic hydrogen stream or from a source of storage over a short distance into the reactor and in proximity of the molten silicon.

Although traverse of the molten zone along the silicon bar or rod under treatment is preferably effected by moving the silicon mass through an emission field of a fixed cathode, such traverse can be accomplished by fixing the anode mass and traversing the cathode and focus electrodes along said mass.

The boron and other impurity concentrations given above together with their segregation coefficients were measured from the resistivity profile of a single crystal. This was obtained by combining Equation 1 below, relating resistivity to concentrations $$\left| \sum_i N_{A_i} - \sum_j N_{D_j} \right| = \frac{J}{R} \quad (1)$$

$R$ = resistivity (ohm-cm.)
$N_A$ = concentration of the $i^{th}$ p type impurity (atoms/cm.$^3$)
$N_D$ = concentration of the $j^{th}$ n type impurity (atoms/cm.$^3$)
$J = (eu)^{-1}$
$e$ = charge on electron (coulombs)
$u$ = mobility (cm.$^2$/volt. sec.)

with Equation 2 below relating concentration to position in the crystal $$N = kN^0 \left( \frac{M^0}{M} \right)^{1-k} \quad (2)$$

$M^0$ = initial mass charged to crucible
$M$ = mass remaining in crucible at time $t$
$N^0$ = initial concentration of impurity in $M^0$
$N$ = concentration in the crystal at the point of contact with the liquid at time $t$
$k$ = segregation coefficient for the impurity The combined equation then becomes one in which the resistivity is a function of the position in the crystal, the initial concentration of each impurity in the silicon and the segregation coefficient of each impurity.

Then, assuming the impurities segregate independently, Equation 2 may be substituted in Equation 1 which will yield the following equation:

$$\sum_i k_i N_{A_i}^0 \left(\frac{M^0}{M}\right)^{1-k_i} - \sum_j k_j N_{D_j}^0 \left(\frac{M^0}{M}\right)^{1-k_j} = \frac{J}{R} \quad (3)$$

where R is measured in the crystal at the point of contact with the liquid at time $t$.

Now it is possible by least squares techniques to fit Equation 3 to data consisting of R's measured at various M's, and thus obtain estimates of the constants, $K_i$, $N_{A_i}$, $k_j$, $N_{D_j}^0$. It is necessary to have the sets of data exceed the number of determined constants by at least two.

In making calculations, the absolute value sign is dropped if the resistivity is taken as positive when p type and negative when n type.

Evaluation employs a floating zone type apparatus and the passing of several molten zones through a sample bar. Because of the multiple passes the second term of the Equation 3 approaches zero with $k_j > 1$. Due to the fact that the segregation coefficient $k$ of boron in silicon is close to unity, the first term is reduced to the following simplification:

$$N_{\text{boron}} = \frac{J}{R} = \frac{290}{R \text{ (ohm-cm.)}} \quad (4)$$

Further practical application of these equations are shown in "Zone Refining" by W. G. Pfann (J. Wiley & Sons, 1958), page 101, last paragraph.

I claim:

1. A method for purifying impurity contaminated elemental silicon comprising subjecting the silicon to melting by heating through means of electrical discharge to a temperature above the melting point of the silicon but below the vaporization temperature within a closed reactor maintained under a pressure ranging from about .1 to 1,000 microns of mercury under anhydrous conditions and in the presence of activated atomic hydrogen, removing from said reactor impurity reaction products evolved in the process, and recovering the purified silicon product.

2. A method for purifying elemental silicon which comprises subjecting impure silicon to melting by heating through means of electrical discharge to a temperature above the melting point of the silicon but below the vaporiation temperature under anhydrous conditions within a closed reactor maintained under a pressure ranging from about .1 to 1,000 microns of mercury containing activated atomic hydrogen formed in the presence of the molten silicon, removing from the reactor impurity reaction products formed in the process, and recovering the purified silicon product.

3. A method for purifying elemental silicon containing trace amounts of objectionable impurities which comprises subjecting said silicon to zone melting by heating through means of electrical discharge to a temperature above the melting point of the silicon but below the vaporization temperature under anhydrous conditions within a closed reaction zone maintained under a pressure ranging from about .1 to 1,000 microns of mercury, throughout the melting operation generating and maintaining activated atomic hydrogen in contact with the molten silicon, removing from the reactor impurity reaction products evolved in the process, and recovering the purified silicon product.

4. A method for purifying boron-contaminated elemental silicon through zone melting which comprises subjecting the silicon to zone melting by heating it through means of electrical discharge to a temperature above the melting point of the silicon but below the vaporization temperature and under anhydrous conditions within a closed reactor maintained under a pressure ranging from about .1 to 1,000 microns of mercury, throughout the melting operation generating and maintaining an atmosphere of highly activated atomic hydrogen in the vicinity of the liquid silicon zone formed during the melting operation, removing from the silicon volatile reaction products which evolve during the process, and recovering the purified silicon product.

5. A method for refining boron-contaminated elemental silicon which comprises charging a solid mass of the silicon into a melting zone maintained under a hydrogen pressure ranging from about .1 to 1,000 microns of mercury, heating a limited area of the surface of said mass to a temperature above the melting point of the silicon but below the vaporization temperature thereof by means of electrical discharge and while anhydrous conditions are maintained in said zone, throughout said heating maintaining a supply of molecular hydrogen in said zone and generating activated atomic hydrogen in said electrical discharge in proximity to the surface of the molten silicon being formed in the process, continuously removing from said melting zone impurity reaction products evolved in the process, and recovering from said zone the purified elemental silicon product.

6. A process for purifying elemental silicon containing trace amounts of boron impurity which comprises subjecting said silicon to heating to a temperature above its melting point but below the vaporization temperature thereof to effect melting thereof while it is maintained under anhydrous conditions and sub-atmospheric pressure ranging from about .1 to 1,000 microns of mercury within a closed reaction zone, generating activated atomic hydrogen within said zone by means of continuously charging dry molecular hydrogen gas thereto and into an electrical gas discharge heating current established between the silicon undergoing melting and a cold surface emission cathode, vaporizing and removing from said silicon impurities following their reaction with said activated atomic hydrogen, and recovering from said zone the chemically purified silicon product.

7. A process for purifying elemental silicon containing trace impurities including boron, comprising subjecting said silicon to melting by heating through means of electrical discharge to a temperature above the melting point of the silicon but below the vaporization temperature within an enclosed moisture-free reaction zone maintained under a hydrogen pressure ranging from about .1 to 1,000 microns of mercury, continuously charging dry molecular hydrogen gas to said zone and generating activated atomic hydrogen therein in proximity to the surface of the molten silicon formed by means of an electrical gas discharge heating current established between the silicon and a cold silicon emission surface of a cathode, removing from said zone and the silicon vaporized impurity reaction products formed in the process, and recovering the chemically purified silicon product.

8. A process for purifying elemental silicon containing trace impurities including boron, which comprises subjecting a mass of said silicon as an anode to melting by heating it to a temperature above its melting point but below its vaporization temperature and by means of a focused, self-maintaining gas discharge electrical heating current of a cold solid silicon emission surface of a cathode under anhydrous conditions within a reaction zone maintained under a hydrogen pressure ranging from about .1 to 1,000 microns of mercury, during the melting operation withdrawing heat from and maintaining the lower portion of the silicon mass in solid form and continuously charging dry molecular hydrogen gas into said zone for passage over the surface of the molten silicon and into said electrical heating current to dissociate and form activated atomic hydrogen in the presence of the molten silicon, continuously withdrawing from said zone reaction product impurities formed therein, and recovering the resulting chemically purified silicon.

9. A process for purifying elemental silicon containing trace amounts of boron as impurity which comprises subjecting a portion of an elongated anode mass of said silicon within a reaction zone maintained under anhydrous conditions and a pressure ranging from 1–300 microns to melting by heating the silicon to a temperature above its melting point but below its vaporization temperature by means of a focused, self-maintaining gas discharge electrical heating current emitted from a cooled solid silicon surface of a cathode disposed above said silicon mass in said zone, concurrently therewith withdrawing heat from the lower portion of said mass to maintain said portion solid throughout the purification operation, continuously charging dry molecular hydrogen gas into said zone and forming activated atomic hydrogen within said heating current for direct contact with the silicon undergoing melting, continuously removing in gaseous state impurity reaction products formed in the process, traversing said mass and said cathode relative to one another to move the molten silicon zone being formed along said silicon mass and to segregate segregatable impurities within said molten zone, continuously removing from the reaction zone volatile reaction products formed therein, and recovering the resulting purified silicon product.

10. A method for purifying elemental silicon containing trace amounts of boron impurity which comprises melting a rod of said silicon within a reaction zone maintained under anhydrous conditions, a hydrogen pressure ranging from about .1 to 1,000 microns of mercury, and containing a cathode emission surface close to a surface of said rod to be melted by heating the silicon to a temperature above its melting point but below its vaporization temperature by means of an electrical, self-maintaining gas discharge heating current, continuously charging dry molecular hydrogen gas to said zone and generating activated atomic hydrogen in said gas discharge heating current adjacent the surface of the silicon undergoing melting, traversing said molten zone along said rod by relative movement longitudinally of the rod between said rod and said cathode emission surface, continuously withdrawing from the reaction zone volatile impurities formed in the process and recovering the resulting purified product.

11. A process for purifying elemental silicon containing trace amounts of boron as an impurity comprising melting said silicon by heating the silicon to a temperature above its melting point but below its vaporization temperature in the presence of activated atomic hydrogen in a reaction chamber maintained under reduced hydrogen pressure ranging from about .1 to 1,000 microns of mercury and anhydrous conditions, effecting said silicon melting by employing silicon as an anode for a cathode from which a focused, self-maintaining gas discharge electrical heating current is emitted, during the melting forming the activated atomic hydrogen in said chamber by dissociating dry molecular hydrogen continuously charged to said chamber and into the gas discharge from said cathode, withdrawing reaction products evolved in the process from said chamber, and recovering the resulting purified silicon product.

References Cited in the file of this patent

UNITED STATES PATENTS

| | | |
|---|---|---|
| 1,683,534 | Edwin | Sept. 4, 1928 |
| 2,555,507 | Pratt | June 5, 1951 |
| 2,754,259 | Robinson et al. | July 10, 1956 |
| 2,866,701 | Strauss | Dec. 30, 1958 |